US007672988B2

(12) United States Patent
Satoh (10) Patent No.: US 7,672,988 B2
(45) Date of Patent: Mar. 2, 2010

(54) ARITHMETIC PROCESSING DEVICE WITH INVALID INPUT KEYSTROKE RECOGNITION AND MENU RETURN FUNCTION (75) Inventor: Tomoaki Satoh, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 1190 days.

(21) Appl. No.: 11/238,033

(22) Filed: Sep. 28, 2005

(65) Prior Publication Data
US 2006/0069705 A1    Mar. 30, 2006

(30) Foreign Application Priority Data
Sep. 28, 2004   (JP)   ............... 2004-282278

(51) Int. Cl.
G06F 3/00 (2006.01)
(52) U.S. Cl. ...................................... 708/145
(58) Field of Classification Search .......... 708/144–145
See application file for complete search history.

(56) References Cited
U.S. PATENT DOCUMENTS
5,124,940 A * 6/1992 Lapeyre ...................... 708/146

6,195,671 B1 * 2/2001 Ito et al. ..................... 708/131
2003/0120997 A1   6/2003 Saito
2004/0087349 A1   5/2004 Uno FOREIGN PATENT DOCUMENTS
DE        32 33 082 A1   3/1983
DE        40 31 242 A1   5/1992
EP        1 413 948 A    4/2004
JP        01-184505 A    7/1989
JP        2001-166864 A  6/2001

OTHER PUBLICATIONS
Japanese Office Action (and English translation thereof) dated Jun. 10, 2008, issued in a counterpart Japanese Application.

* cited by examiner

Primary Examiner—Tan V Mai
(74) Attorney, Agent, or Firm—Frishauf, Holtz, Goodman & Chick, P.C.

(57) ABSTRACT

An arithmetic processing device includes a menu displaying unit which displays a menu screen for a plurality of arithmetic processings when the predetermined key is operated, each of the arithmetic processings being assigned to one of a plurality of numeric keys; an arithmetic processing unit which, when a numeric key allocated to any one of the arithmetic processings is operated, executes an arithmetic processing corresponding to the operated key; and a display controller which, when a key other than the numeric keys assigned to the arithmetic processings is operated, displays a specific mark.

6 Claims, 6 Drawing Sheets

ARITHMETIC PROCESSING DEVICE WITH INVALID INPUT KEYSTROKE RECOGNITION AND MENU RETURN FUNCTION

CROSS-REFERENCE TO RELATED APPLICATIONS

This application is based upon and claims the benefit of priority from prior Japanese Patent Application No. 2004-282278, filed Sep. 28, 2004, the entire contents of which are incorporated herein by reference.

BACKGROUND OF THE INVENTION

1. Field of the Invention

The present invention relates to an arithmetic processing device which carries out a calculation in accordance with a predetermined key operation and displays a calculation result, and which displays a specific mark when a key operation other than the predetermined key operation is carried out.

2. Description of the Related Art

Conventionally, an apparatus called a portable electronic calculator has been known which has a function of inputting numeric values and various operators. The electronic calculator calculates numeric values on the basis of an input operator, and displays the calculation result. Further, there are electronic calculators called scientific electronic calculators which can carry out, in addition to arithmetical operations, various functional calculus of trigonometric functions, logarithmic functions, and the like.

In such scientific electronic calculators, there are many types of available functions or functionalities (hereinafter, simply called functions for short), and on the other hand, the number of utilizable keys is limited as a compact electronics device. Then, all the functions cannot be allocated to dedicated keys, and a menu screen on which a list of functions is displayed as a menu, and the function is input by designating a numeric key allocated to a function on the menu, has been known (Japanese Patent Application KOKAI Publication No. 2001-166864).

However, in the menu display device described above, when a key which does not correspond to the menu (for example, a key other than predetermined numeric keys) is operated during a display of the menu, it is impossible to know whether the operated key is received as a valid instruction, or the operated key is not received as a valid instruction and handled as an invalid instruction. For example, in an electric calculator, when a user operates another key which does not correspond to the items of the menu in error in the process of inputting an arithmetic expression, the user loses sight to what extent the arithmetic expression has been input. Consequently, the user is required to input the arithmetic expression again from the beginning.

BRIEF SUMMARY OF THE INVENTION

An object of the present invention is to provide an arithmetic processing device by which, when an erroneous operation is carried out in the process of operating, it is possible to inform a user that an input by the erroneous operation is invalid.

According to an embodiment of the present invention, an arithmetic processing device comprises:

a key input unit including a predetermined key and numeric keys;

a menu displaying unit which displays a menu screen for a plurality of arithmetic processings when the predetermined key is operated, each arithmetic processings being allocated to each numeric keys;

an arithmetic processing unit which, when a numeric key allocated to any one of the arithmetic processings is operated during a display of the menu screen, executes an arithmetic processing corresponding to the operated key; and a display controller which, when a key other than the numeric keys allocated to the arithmetic processings is operated during a display of the menu screen, displays a specific mark.

According to another embodiment of the present invention, an arithmetic processing device for carrying out a calculation in accordance with an operation of a key input unit, where numeric keys are respectively allocated to a plurality of arithmetic processings, and for displaying a calculation result, the arithmetic processing device comprises:

a determination unit which determines whether or not a key operated subsequent to an operation of a predetermined key is a numeric key allocated to any one of the arithmetic processings;

an arithmetic processing unit which, when the determination unit determines that the key operated subsequent to the operation of the predetermined key is the numeric key allocated to any one of the arithmetic processings, executes an arithmetic processing corresponding to the operated numeric key; and a display controller which, when the determination unit determines that the key operated subsequent to the operation of the predetermined key is not the numeric key allocated to any one of the arithmetic processings, displays a specific mark.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

An embodiment of an arithmetic processing device according to the present invention will now be described with reference to the accompanying drawings. Here, description of the arithmetic processing device will be carried out by using a scientific electronic calculator as an example. However, it is not limited thereto, and various electronics device having a calculating function, such as notebook type personal computers, PDAs (personal digital assistants), and multifunctional mobile telephones, can be also applied to the invention.

Figure 1:
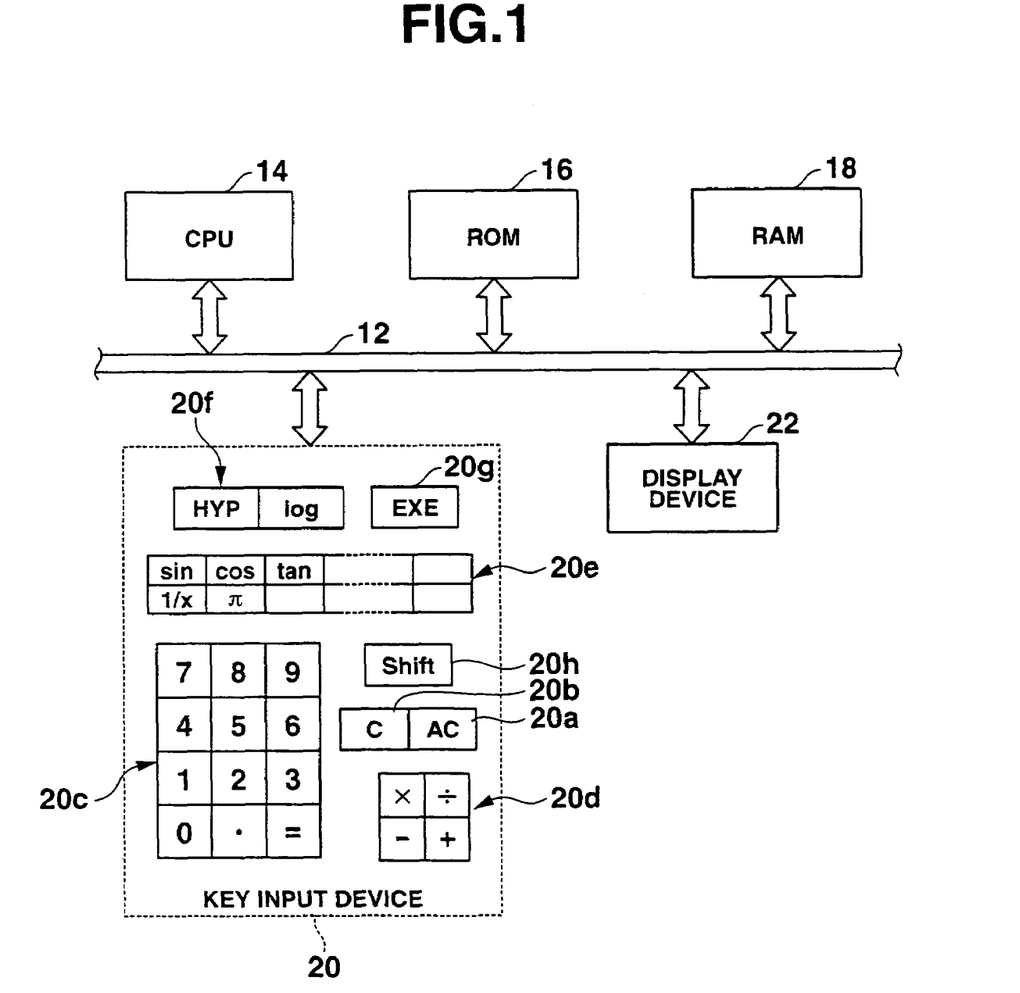
FIG. 1 is a block diagram showing a circuit configuration of a scientific electronic calculator which is a first embodiment of the present invention.

FIG. 1 is a block diagram showing a configuration of a scientific electronic calculator serving as a portable arithmetic processing device according to a first embodiment of the invention.

A CPU 14, a ROM 16, a RAM 18, a key input unit 20, and a display unit 22 are connected to a system bus 12. The key input unit 20 is an input device having a key group, such as numeric keys and an arithmetic key, which are necessary for inputting mathematical formulas, selecting functions, and the like. The key input unit 20 outputs a key signal to the CPU 14 in response to a pressed down key. Input means such as input of a mathematical formula, selection of a function, and instruction to carry out a calculation are realized by key inputs by the key input unit 20. The key input unit 20 includes an AC key 20a, a clear key 20b, a numeric keypad 20c including "0" to "9", "•", and "=" keys, four-rules operator keys 20d, function keys 20e, function menu keys 20f, an execution key 20g, a shift key 20h, and the like.

The AC key 20a is a key for turning a power source on and for clearing all. The numeric keypad 20c is keys for inputting numeric values to the scientific electronic calculator, and the function keys 20e are keys allocated individual functions (in actuality, two functions are allocated).

The function menu keys 20f are keys for displaying a function menu which is a list of functions, and here, a hyperbolic function and a logarithm function are illustrated as an example. The execution key 20g is a key for instructing to carry out a function.

The shift key 20h is a key which is utilized to be pressed down in combination with other keys. For example, when the AC key 20a is pressed down, the power source of the scientific electronic calculator is made to be in an on-state, and the power source of the scientific electronic calculator is made to be in an off-state by pressing down the shift key 20h and the AC key 20a in combination. Further, the shift key 20h is a key for switching two functions allocated to the function keys 20e.

The display unit 22 is a portion on which there are displayed various data, mathematical formulas, calculation results, and the like which are necessary for using the scientific electronic calculator, such as mathematical formulas and characters corresponding to various keys being pressed down. The display unit 22 is composed of a dot-matrix system liquid crystal display (LCD). However, the display unit 22 may be a segment system liquid crystal display device or the like.

The ROM 16 stores a control program, a calculation program, function menu data, and specific mark data therein. A specific mark is to inform a user that, when an erroneous operation is carried out in the process of operating, an input by the erroneous operation is invalid, and here, it is a symbol configured of a letter string, such as "AAA."

The function menu data is to store a function list displayed when the function menu key 20f is pressed, and menu numbers and functions are respectively made to correspond to each other for each function menu key as in the following table.

TABLE 1

| Function menu keys | Menu numbers | Functions |
|---|---|---|
| HYP | 1 | sinh |
|  | 2 | cosh |
|  | 3 | tanh |
|  | 4 | $\sinh^{-1}$ |
|  | 5 | $\cosh^{-1}$ |
|  | 6 | $\tanh^{-1}$ |
| log | 1 | log |
|  | 2 | ln |

The RAM 18 is a work memory into which various programs executed by the CPU 14, data relating to the executions of these programs, and the like are temporarily maintained.

Figure 2:
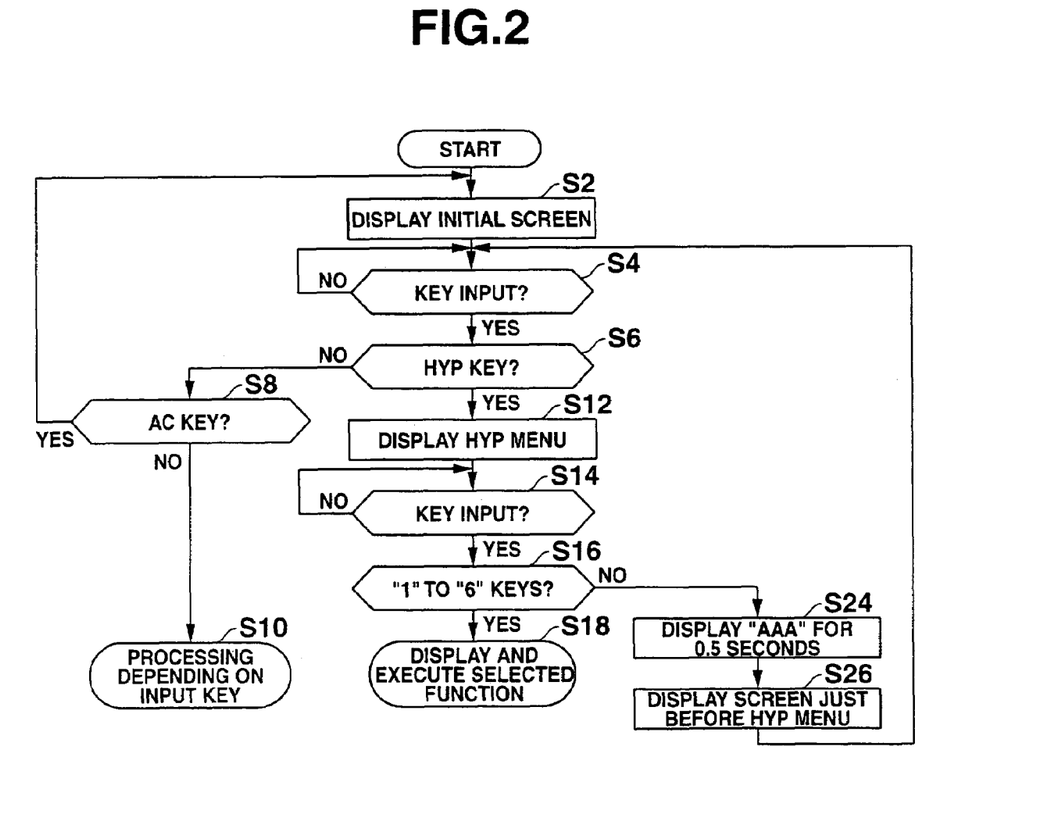
FIG. 2 is a flowchart showing control processing of the first embodiment.
Figure 3:
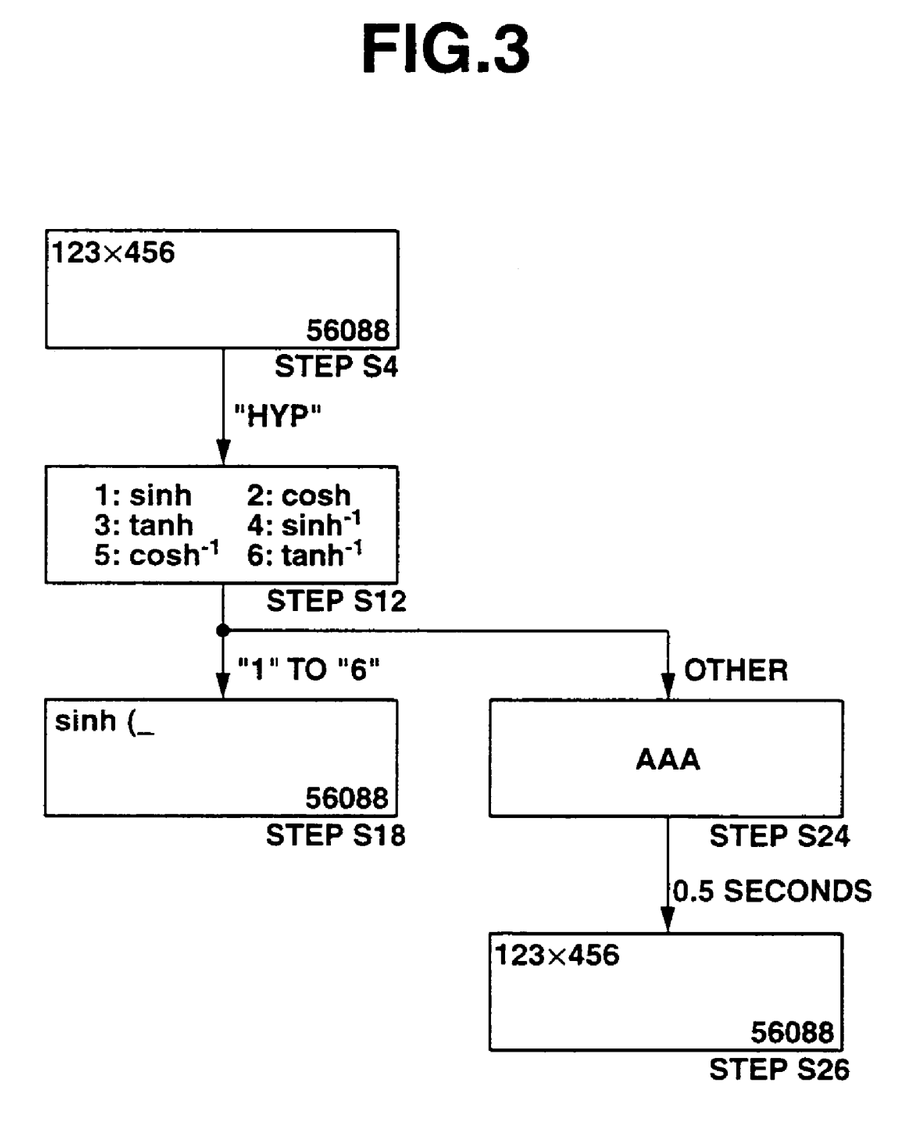
FIG. 3 is a chart showing a transition of a display screen in the first embodiment.

Next, the operation of the scientific electronic calculator in the present embodiment will be described. FIG. 2 is a flowchart showing display control processing executed by the CPU 14, and is a flowchart in a case where the hyperbolic function key is pressed as a function menu key. FIG. 3 is a chart showing a transition of the display screen in accordance with the flowchart of FIG. 2.

When the power source is turned on, a predetermined initial screen is displayed in step S2. In step S4, it is determined whether or not a key has been input. When it is determined that a key has been input, the input key data is displayed, as shown in FIG. 3, and it is determined in step S6 whether or not the input key is the hyperbolic function key 20f.

FIG. 3 shows a state in which "1", "2", "3", "x", "4", "5", "6", and "EXE" keys are pressed. Those are displayed on an arithmetic expression display region in the upper left portion of the screen. When the "EXE" key is pressed, "56088" which is the multiplication result is displayed on an arithmetic operation result display region in the lower right portion of the screen.

When it is determined in step S6 that the input key is not the hyperbolic function key 20f, it is determined in step S8 whether or not the input key is the AC key 20a. When the input key is the AC key 20a, the process returns to step S2, and the initial screen is displayed. When the input key is not the AC key 20a, processing corresponding to the input key is executed in step S10.

When it is determined in step S6 that the input key is the hyperbolic function key 20f, a hyperbolic function menu is displayed in step S12 as shown in FIG. 3. This menu shows that six hyperbolic functions are respectively allocated to the numbers from 1 to 6, whereby it is possible to select a function by inputting a numeric key.

It is determined in step S14 whether or not a key has been input. Step S14 is repeated until a key input is detected. When a key input is detected, it is determined in step S16 whether or not any one of the keys from "1" to "6" has been input. When it is determined in step S14 that any one of the keys from "1" to "6" has been input, a function allocated to the input key is displayed on the arithmetic expression display region in the upper left portion of the screen in step S18 as shown in FIG. 3, and thereafter, a calculation is carried out. Here, the state in which the "1" key is input, and "sinh" is selected is shown.

When it is determined in step S16 that a key other than the keys from "1" to "6" has been input, this is an erroneous operation. Therefore, the specific mark which is a symbol configured of a letter string "AAA" (which is to inform a user that an erroneous operation is carried out in the process of operating, and an input by the erroneous operation is invalid) is displayed as shown in FIG. 3. The display is not carried out endlessly, but is terminated for a predetermined time (here, for 0.5 seconds), and in step S26, the process returns to the screen display immediately before the hyperbolic function menu is displayed as shown in FIG. 3. Namely, the process returns to the screen on which "123×456" is displayed on the arithmetic expression display region in the upper left portion of the screen, and "56088" is displayed on the arithmetic operation result display region in the lower right portion of the screen. Thereafter, the flow returns to step S4, and it is determined whether or not a key has been input.

According to a scientific electronic calculator according to the embodiment, a menu for a plurality of functions is displayed on the display unit by operating the function menu key even if many functions are not allocated to individual keys exclusively, and an arithmetic expression is input by designating one of the items of the menu. In the scientific electronic calculator, when a key other than the keys made to correspond to selections of items of menu is operated, the specific mark is displayed on the display unit 22 for a predetermined time.

As a consequence, even when an operation of a key which is not made to correspond to a designation of an item of the menu is carried out in error, it is possible for a user to clearly identify that the key operation has not been received because of an invalid key operation when the specific mark is temporarily displayed.

Further, after the specific mark is temporarily displayed, the display screen returns to the display screen immediately before the function menu is displayed, i.e., a display state immediately before an erroneous operation is carried out. Accordingly, if the user erroneously inputs the function menu keys 20f, the display screen returns to that immediately before the function menu is displayed by depressing the key other than the keys made to correspond to selections of items of menu. The erroneous function menu display is cancelled.

Further, it is possible for the user to easily and quickly correct an erroneous key input even if the key other than the keys made to correspond to selections of items of menu is operated so that a correct arithmetic expression can be obtained.

Figure 4:
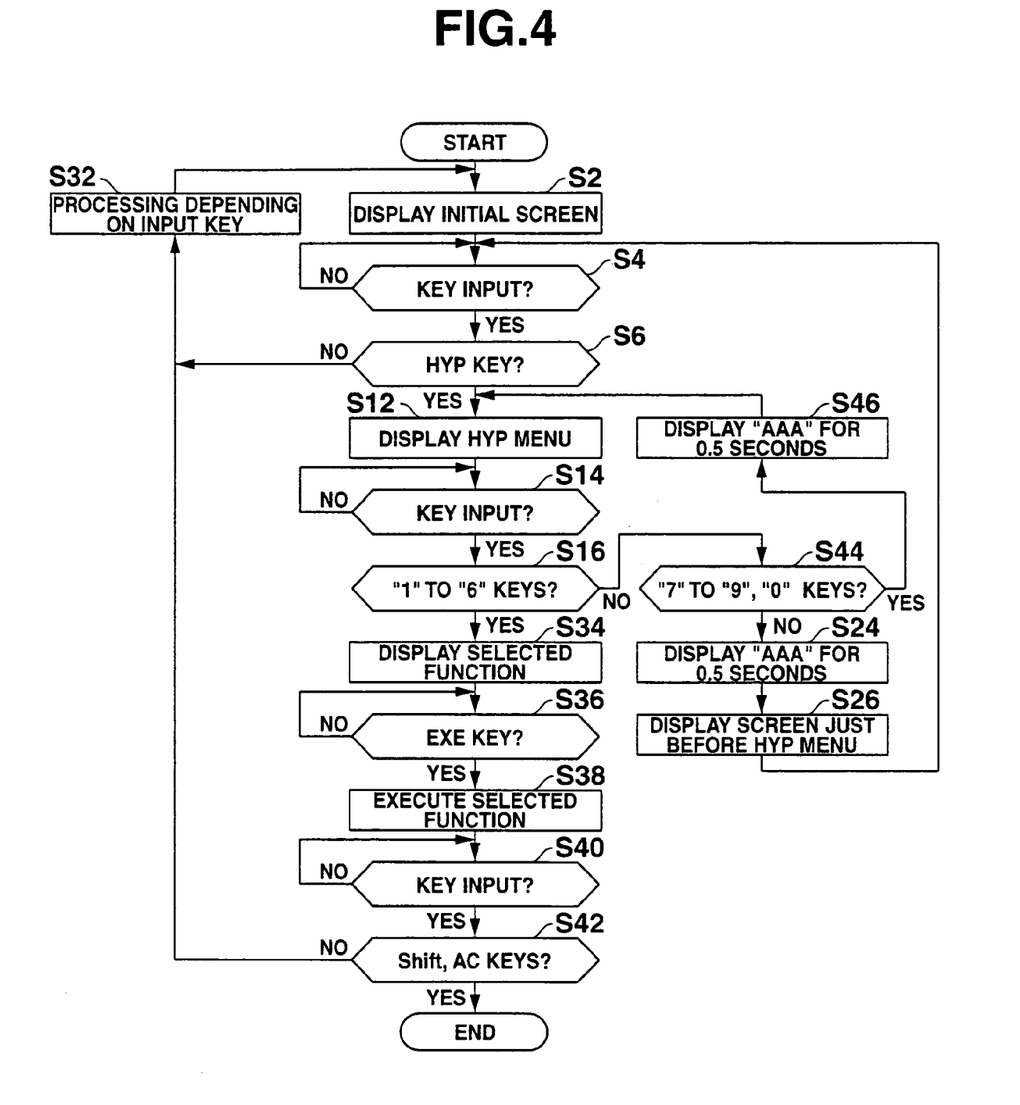
FIG. 4 is a flowchart showing control processing of a second embodiment of the present invention.

A second embodiment will be described. In this embodiment, portions which are the same as those in the first embodiment are denoted by the same reference numerals, and detailed descriptions thereof will be omitted. In the first embodiment, as an erroneous operation on the function menu screen, there is only one type (there is one type as a display mode of the specific mark). However, in the second embodiment, the erroneous operation is further divided into two types, and the display mode of the specific mark is made to vary in accordance with each type. The block circuit diagram is the same as that in FIG. 1. FIG. 4 is a flowchart showing display control processing executed by the CPU 14 in the second embodiment, and FIG. 5 is a chart showing a transition of the display screen in accordance with the flowchart of FIG. 4.

When the power source is turned on, a predetermined initial screen is displayed in step S2. In step S4, it is determined whether or not a key has been input. When it is determined in step S4 that a key has been input, the input key data is displayed in step S6 as shown in FIG. 5, and it is determined in step S6 whether or not the input key is the hyperbolic function key 20f.

Figure 5:
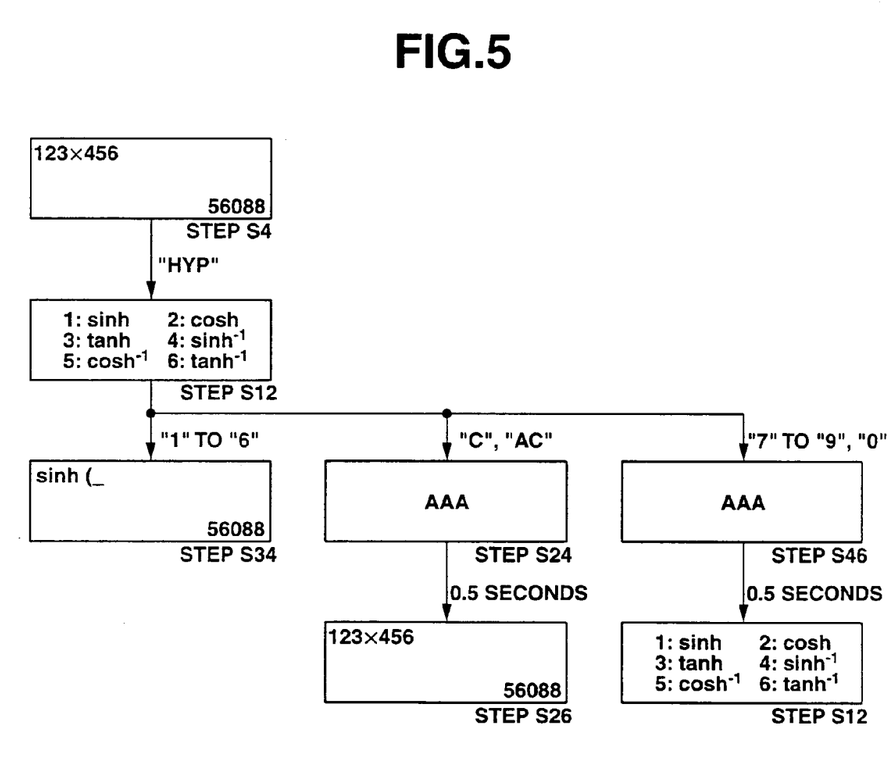
FIG. 5 is a chart showing a transition of a display screen in the second embodiment.

FIG. 5 shows a status in which "1", "2", "3", "x", "4", "5", "6", and "EXE" keys are pressed. Those are displayed on an arithmetic expression display region in the upper left portion of the screen. When the "EXE" key is pressed, "56088" which is a multiplication result is displayed on an arithmetic operation result display region in the lower right portion of the screen.

When it is determined in step S6 that the input key is not the hyperbolic function key 20f, processing corresponding to the input key is executed in step S32. Thereafter, the process returns to step S2.

When it is determined in step S6 that the input key is the hyperbolic function key 20f, a hyperbolic function menu is displayed in step S12 as shown in FIG. 5. This menu shows that six hyperbolic functions are respectively allocated to the numbers from 1 to 6, whereby it is possible to select a function by inputting a numeric key.

In step S14, it is determined whether or not a key has been input. Step S14 is repeated until a key input is detected. When a key input is detected in step S14, it is determined in step S16 whether or not any one of the keys from "1" to "6" has been input. When it is determined in step S16 that any one of the keys from "1" to "6" has been input, a function allocated to the input key is displayed on the arithmetic expression display region in the upper left portion of the screen in step S34 as shown in FIG. 5. Here, the state in which the "1" key is input, and "sinh" is selected is shown.

In step S36, it is determined whether or not the execution key has been input. Step S36 is repeated until an input of the execution key is detected. When an input of the execution key is detected in step S36, a calculation of the selected function is executed in step S38.

In step S40, it is determined whether or not a key has been input. Step S40 is repeated until a key input is detected. When a key input is detected in step S40, it is determined in step S42 whether or not the "shift" key and the "AC" key are input. In a case of YES, the power source is turned off, and the processing is terminated. In a case of NO, processing corresponding to the key is executed in step S32. Thereafter, the process returns to step S2.

When it is determined in step S16 that a key other than the keys from "1" to "6" has been input (an erroneous operation has been carried out), it is determined in step S44 whether or not one of the keys from "7" to "9" and "0" has been input. In the first embodiment, a case where a key other than the keys from "1" to "6" has been input on the function menu screen is a single operation. In the second embodiment, however, the operation is made to vary in accordance with whether or not one of the keys from "7" to "9" and "0" has been input.

When it is determined in step S44 that any one of the keys from "7" to "9" and "0" has been input, the specific mark which is a symbol configured of a letter string "AAA" (which is to inform a user that an erroneous operation is carried out in the process of operating, and an input by the erroneous operation is invalid) is displayed in step S46 as shown in FIG. 5. The display is not carried out endlessly, but is terminated for a predetermined time (here, for 0.5 seconds), and the process returns to a display of the hyperbolic function menu in step S12. Therefore, the user can easily input a correct numeric key for designating the function indicated in the menu.

When it is determined in step S44 that a key other than the keys from "7" to "9" and "0" has been input, the specific mark which is a symbol configured of a letter string "AAA" (which is to inform a user that an erroneous operation is carried out in the process of operating, and an input by the erroneous operation is invalid) is displayed as shown in FIG. 5. The display is not carried out endlessly, but is terminated for a predetermined time (here, for 0.5 second), and in step S26, the process returns to the screen display immediately before the hyperbolic function menu is displayed as shown in FIG. 5. Namely, the display screen returns to the screen on which "123×456" is displayed on the arithmetic expression display region in the upper left portion of the screen, and "56088" is displayed on the arithmetic operation result display region in the lower right portion of the screen. Thereafter, the flow returns to step S4, and it is determined whether or not a key has been input. In the same manner as the first embodiment, the erroneous function menu display is cancelled by depressing a key other than the numeric keys.

According to the second embodiment, when an operation of a key other than the predetermined keys is carried out at the time of selecting an item of the function menu, the specific mark is displayed on the display unit for a predetermined time. In addition, restoration of the display screen is classified into two restorations: one is due to depression of numeric keys other than the numeric keys made to correspond to items of the menu, whose frequencies are relatively high; and the other is due to depression of keys other than the numeric keys, whose frequencies are relatively low. When a numeric key other than the numeric keys made to correspond to items of the menu is depressed, the display screen returns to the function menu display after the specific mark is displayed, and an item of the menu can be selected again immediately. When a key other than the numeric keys is depressed, the display screen returns to the display screen immediately before the function menu is displayed, i.e., immediately before the function menu key is depressed. Therefore, it is possible for the user to continue to input an arithmetic expression from the display state.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, when the log function key is pressed as a function menu key, a determination of an input of a predetermined key in step S16 in FIGS. 2 and 4 is naturally a determination whether the "1" key or the "2" key has been input. In response, with respect to a determination in step S44 in the second embodiment, it is determined whether or not one of keys from "3" to "9" and "0" keys has been input.

It has been described that, when an erroneous operation is carried out, the letter string which is "AAA" is described as an example of the specific mark displayed on the display unit 22, but not limited to "AAA." A plurality of marks may be prepared, and a mark selected in accordance with a situation (for example, in accordance with a function menu key) may be displayed.

Figure 6:
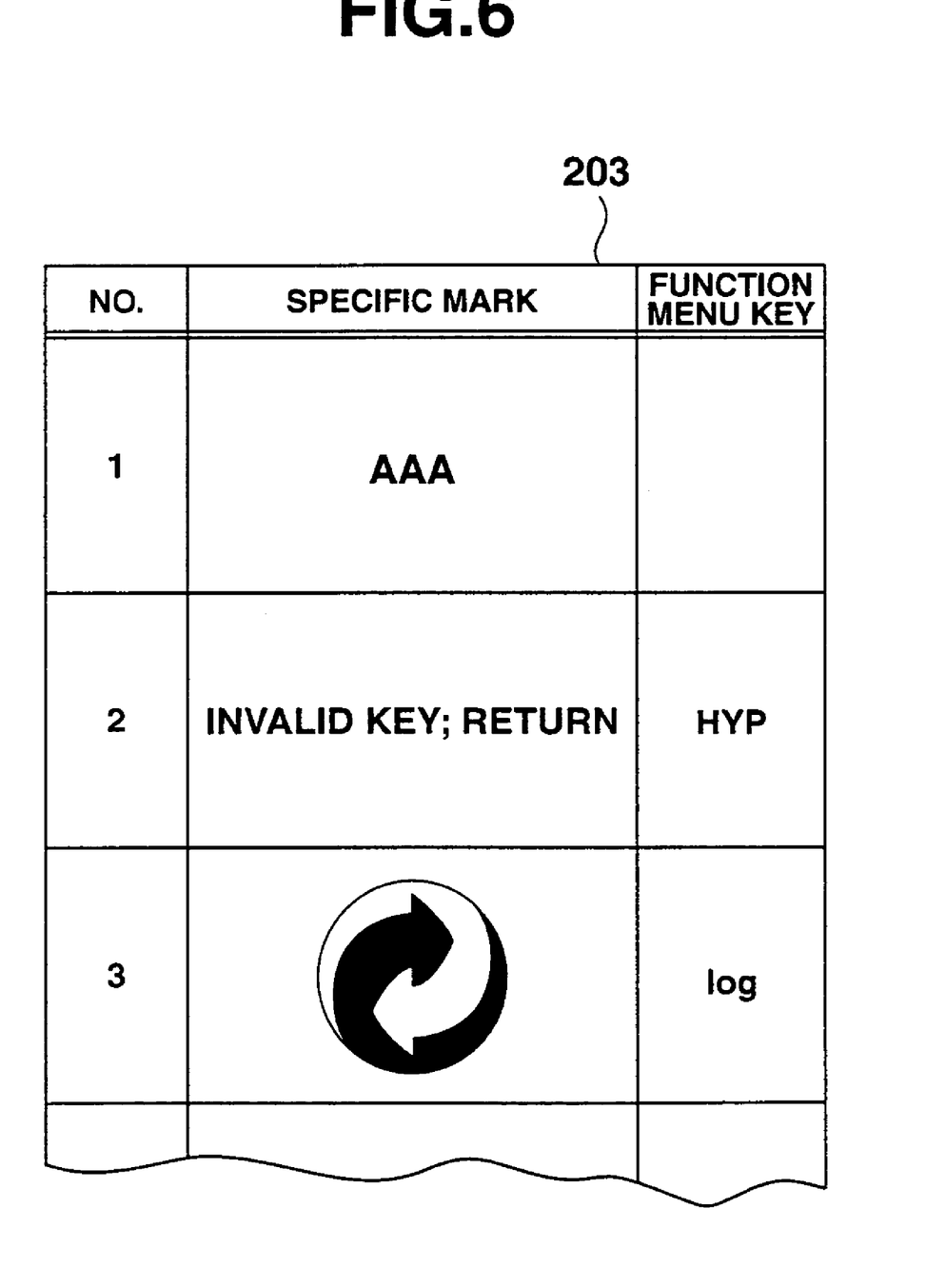
FIG. 6 is a diagram showing variations in a specific mark.

For example, a specific mark selection table as shown in FIG. 6 may be provided in the ROM 16, and the CPU 14 may control a display of the specific mark with reference to the table. More specifically, in addition to "AAA," there is text data such as "Invalid key; Return" as a specific mark. This mark includes a message showing that the display screen returns to a previous screen before a function menu key is depressed. Therefore, it is possible to clearly inform the user that the screen displayed after the specific mark is temporarily displayed is the display screen before the function menu key is operated. Or, a pattern indicating a restoration of the screen return is displayed as a specific mark. Moreover, not only the specific mark is displayed so as to be lighted, but also the specific mark may be displayed so as to blink on and off, and may be composed of a moving pattern such as an animation. Then, when the hyperbolic function key is input as a function menu key, "Invalid key; Return" is displayed, and when the logarithm function is input, a pattern is displayed. It has been described that the specific mark selection table is set to the ROM 16 by default. However, a setting screen on which the user can arbitrarily select and set those may be displayed, and a specific mark may be displayed in accordance with a selection condition and a symbol number which are set on the setting screen. Further, in the second embodiment, different specific marks can be displayed in steps S24 and S46.

What is claimed is:

1. A display control method for a scientific electronic calculator comprising a key input unit and a display unit, wherein the key input unit comprises numeric keys and function menu keys, the display control method comprising:
   a menu displaying step of displaying a menu screen for functional arithmetic processings on the display unit when one of the function menu keys is operated, wherein a portion of the numeric keys are assigned to the functional arithmetic processings;
   a functional arithmetic processing step of, when one of the numeric keys assigned to one of the functional arithmetic processings is operated during display of the menu screen, executing a functional arithmetic processing corresponding to the operated numeric key;
   a first invalid input informing step of displaying a first specific mark on the display unit when one of the numeric keys other than the numeric keys assigned to the functional arithmetic processings is operated during display of the menu screen, and of returning the display unit to the menu screen; and
   a second invalid input informing step of displaying a second specific mark on the display unit when a key other than any one of the numeric keys is operated during display of the menu screen, and of returning the display unit to a screen immediately before the menu screen.

2. The method according to claim 1, wherein the function menu keys include a hyperbolic function key.

3. The method according to claim 1, wherein the second specific mark comprises a message indicating that the screen of the display unit is returned to the screen immediately before the menu screen.

4. A scientific electronic calculator comprising:
   a key input unit comprising numeric keys and function menu keys;
   a display unit;
   a menu displaying unit which displays a menu screen for functional arithmetic processings on the display unit when one of the function menu keys is operated, wherein a portion of the numeric keys are assigned to the functional arithmetic processings;
   a functional arithmetic processing unit which, when one of the numeric keys assigned to one of the functional arithmetic processings is operated during display of the menu screen, executes a functional arithmetic processing corresponding to the operated numeric key;
   a first invalid input informing unit which displays a first specific mark on the display unit when one of the numeric keys other than the numeric keys assigned to the functional arithmetic processings is operated during display of the menu screen, and which returns the display unit to the menu screen; and
   a second invalid input informing unit which displays a second specific mark on the display unit when a key other than any one of the numeric keys is operated during display of the menu screen, and which returns the display unit to a screen immediately before the menu screen.

5. The calculator according to claim 4, wherein the function menu keys include a hyperbolic function key.

6. The calculator according to claim 4, wherein the second specific mark comprises a message indicating that the screen of the display unit is returned to the screen immediately before the menu screen.

* * * * *